United States Patent
Kelly et al.

(10) Patent No.: US 7,264,734 B2
(45) Date of Patent: Sep. 4, 2007

(54) METHOD FOR TREATING DREDGED MATERIAL

(75) Inventors: Joseph M. Kelly, Westchester, PA (US); Daniel J. Edwards, Union, NJ (US)

(73) Assignee: AGL Resources, Atlanta, GA (US)

( * ) Notice: Subject to any disclaimer, the term of this patent is extended or adjusted under 35 U.S.C. 154(b) by 0 days.

(21) Appl. No.: 10/040,142

(22) Filed: Jan. 3, 2002

(65) Prior Publication Data

US 2003/0121863 A1 Jul. 3, 2003

(51) Int. Cl.
*C02F 11/14* (2006.01)

(52) U.S. Cl. .................. 210/710; 37/195; 210/721; 210/727; 210/754; 210/758; 210/759; 210/760; 405/128.75; 588/256; 588/257

(58) Field of Classification Search ................. 210/710, 210/721, 725, 727, 728, 734, 753, 754, 756, 210/758, 759, 760; 405/128.75, 129.25; 588/256, 257; 37/195, 307
See application file for complete search history.

(56) References Cited

U.S. PATENT DOCUMENTS

| | | | |
|---|---|---|---|
| 3,975,266 A | 8/1976 | Baize | 210/10 |
| 4,129,449 A | 12/1978 | Kojima | 106/95 |
| 4,149,968 A | 4/1979 | Kupiec et al. | 210/28 |
| 4,539,121 A | 9/1985 | Kapland et al. | 210/751 |
| 5,240,608 A | 8/1993 | Gurfinkel et al. | 210/319 |
| 5,587,069 A | 12/1996 | Downey | 210/192 |
| 5,593,248 A | 1/1997 | Kansa et al. | 405/128 |
| 5,795,285 A * | 8/1998 | McLaughlin et al. | 588/256 |
| 5,803,894 A | 9/1998 | Kao et al. | 588/257 |
| 5,849,201 A * | 12/1998 | Bradley | 210/752 |
| 5,914,040 A | 6/1999 | Pescher et al. | 210/638 |
| 6,042,305 A | 3/2000 | Novich et al. | 405/266 |
| 6,197,187 B1 | 3/2001 | Thornton et al. | 205/743 |
| 6,245,241 B1 | 6/2001 | Kupczik et al. | 210/759 |
| 6,276,871 B1 | 8/2001 | Bruso | 405/128.5 |
| 6,277,414 B1 | 8/2001 | Elhaik et al. | 424/616 |
| 6,290,857 B1 | 9/2001 | Brahmbhatt et al. | 210/758 |
| 6,293,731 B1 | 9/2001 | Studer | 405/129.2 |
| 6,428,705 B1 * | 8/2002 | Allen et al. | 210/638 |
| 6,869,539 B2 * | 3/2005 | Sheets | 210/747 |

FOREIGN PATENT DOCUMENTS

JP 03233015 A * 2/1990
JP 411156397 A * 6/1999

* cited by examiner

*Primary Examiner*—Peter A. Hruskoci
(74) *Attorney, Agent, or Firm*—Day Pitney LLP

(57) ABSTRACT

The present invention provides a method for treating dredged material in which liquid is first added to the dredged material, and dewatering the dredged material to obtain a filtrate and a solid portion. Contaminants are removed from the dredged material by at least one oxidation process. The solid portion may be used to form structural articles.

6 Claims, 3 Drawing Sheets

| STREAM | 1 | 2 | 3 | 4 | 5 | 6 | 7 | 8 | 9 | 10 | 11 | 12 |
|---|---|---|---|---|---|---|---|---|---|---|---|---|
| DESCRIPTION | RAW SEDIMENT FROM BARGE TO SITE | DEBRIS TO DISPOSAL | RAW SEDIMENT FROM BARGE LESS DEBRIS | TOTAL RECYCLE FILTRATE WATER | RECYCLE FILTRATE WATER TO IONIZER | IONIZED WATER FROM IONIZER TO MIXER | ADDITIVE PACKAGE TO MIXER | MIXER OUTLET | MIXER OUTLET TO SLURRY TANK | MIXER OUTLET TO PUG MILL | RECYCLE FILTRATE WATER TO SLURRY TANK | SLURRY FEED TO DEWATERING |
|  | #/HR | #/HR | #/HR | #/HR | #/HR | #/HR | #/HR | #/HR | #/HR | #/HR | #/HR | #/HR |
| DRY SEDIMENT | 33,783.8 | 2,079.0 | 31,704.8 | 11.0 | 0.3 | 0.3 |  | 0.3 | 0.3 | - | 10.7 | 31,818.8 |
| WATER | 70,166.3 |  | 70,166.3 | 110,139.0 | 2,676.3 |  |  |  |  |  | 107,462.7 | 180,305.2 |
| DECON CHEMICAL ADDITIVES: |  |  |  |  |  |  |  |  |  |  |  |  |
| OXIDANT |  |  |  |  |  |  | 79.3 | 79.3 | 79.3 | - |  |  |
| IONIZED WATER |  |  |  |  |  | 2,676.3 |  | 2,676.3 | 2,676.3 |  |  |  |
| DEWATERING POLYMER |  |  |  |  |  |  | 23.8 | 23.8 | 23.8 | - |  |  |
| BENEFICIAL USE ADDITIVES: |  |  |  |  |  |  |  |  |  |  |  |  |
| FLY ASH |  |  |  |  |  |  |  |  |  |  |  |  |
| CEMENT |  |  |  |  |  |  |  |  |  |  |  |  |
| OTHER |  |  |  |  |  |  |  |  |  |  |  |  |
| TOTAL | 103,950.0 | 2,079.0 | 101,871.0 | 110,150.0 | 2,676.6 | 2,676.6 | 103.0 | 2,779.6 | 2,779.6 | - | 107,473.4 | 212,124.0 |
| BULK DENSITY: |  |  |  |  |  |  |  |  |  |  |  |  |
| STREAM, #/CF | 77.0 | 80.0 | 76.9 | 64.0 | 64.0 | 64.0 | 65.5 | 65.5 | 65.5 |  | 64.0 | 69.6 |
| VOLUME FLOW |  |  |  |  |  |  |  |  |  |  |  |  |
| GPM | 168.3 |  | 165.1 | 214.6 | 5.2 | 5.2 | 0.2 | 5.3 | 5.3 |  | 209.3 | 379.8 |
| CY/HR | 50.0 | 1.0 | 49.0 | 63.7 | 1.5 | 1.5 | 0.1 | 1.6 | 1.6 |  | 62.2 | 112.8 |
| WT% SOLIDS | 32.500% |  | 31.122% | 0.010% | 0.010% | 0.010% | 100.000% | 3.717% | 3.717% |  | 0.010% | 15.000% |
| WT% WATER | 67.500% |  | 68.878% | 99.990% | 99.990% | 99.990% | 0.000% | 96.283% | 96.283% |  | 99.990% | 85.000% |
| WT% WATER/WT% SOLIDS * 100% | 207.7% |  | 221.3% |  |  |  |  |  |  |  |  |  |
| OXIDANT, PPM OF DRY SEDIMENT |  |  |  |  |  |  |  |  |  |  |  |  |
| POLYMER, # PER TON OF DRY SEDIMENT |  |  |  |  |  |  |  |  |  |  |  |  |
| WATER REMOVED: |  |  |  |  |  |  |  |  |  |  |  |  |
| GALLONS PER CY OF RAW SEDIMENT |  |  |  |  |  |  |  |  |  |  |  |  |
| % OF RAW SEDIMENT VOLUME |  |  |  |  |  |  |  |  |  |  |  |  |
| FLY ASH ADDED AS % OF DEWATERED SEDIMENT |  |  |  |  |  |  |  |  |  |  |  |  |
| CEMENT ADDED AS % OF DEWATERED SEDIMENT |  |  |  |  |  |  |  |  |  |  |  |  |
| FLY ASH ADDED IN # PER CY OF RAW SEDIMENT |  |  |  |  |  |  |  |  |  |  |  |  |
| CEMENT ADDED IN # PER CY OF RAW SEDIMENT |  |  |  |  |  |  |  |  |  |  |  |  |

Figure 2(a)

| STREAM | 13 | 4 | 14 | 15 | 16 | 17 | 18 | 19 | 20 | 21 | 22 | 23 | 24 |
|---|---|---|---|---|---|---|---|---|---|---|---|---|---|
| DESCRIPTION | TOTAL FILTRATE WATER | TOTAL RECYCLE FILTRATE WATER | PRODUCT FILTRATE WATER TO SAND FILTER | PRODUCT FILTRATE WATER FROM SAND FILTER | SEDIMENT CAPTURED ON SAND FILTER | DEWATERED SEDIMENT FROM DEWATERING | DEWATERED SEDIMENT TO PUG MILL MILL | DEWATERED SEDIMENT TO BENEFICIAL USE | FLY ASH ADDED TO PUG MILL | CEMENT ADDED TO PUG MILL | OTHER ADDED TO PUG MILL | BENEFICIAL USE PRODUCT FROM PUG MILL | TOTAL BENEFICIAL USE PRODUCT |
|  | #/HR | #/HR | #/HR | #/HR | #/HR | #/HR | #/HR | #/HR | #/HR | #/HR | #/HR | #/HR | #/HR |
| DRY SEDIMENT | 15.6 | 11.0 | 4.6 | 1.4 | 3.2 | 31,803.2 | 31,803.2 |  |  |  |  | 41,288.4 | 31,803.2 |
| WATER | 156,313.3 | 110,139.0 | 46,174.3 | 46,174.3 | 0.0 | 23,991.9 | 23,991.9 |  |  |  |  | 22,039.1 | 23,991.9 |
| DECON CHEMICAL ADDITIVES: |  |  |  |  |  |  |  |  |  |  |  |  |  |
| OXIDANT |  |  |  |  |  |  |  |  |  |  |  |  |  |
| IONIZED WATER |  |  |  |  |  |  |  |  |  |  |  |  |  |
| DEWATERING POLYMER |  |  |  |  |  |  |  |  |  |  |  |  |  |
| BENEFICIAL USE ADDITIVES: |  |  |  |  |  |  |  |  |  |  |  |  |  |
| FLY ASH |  |  |  |  |  |  |  |  | 5,579.5 |  |  |  |  |
| CEMENT |  |  |  |  |  |  |  |  |  | 1,952.8 |  |  |  |
| OTHER |  |  |  |  |  |  |  |  |  |  | - |  |  |
| TOTAL | 156,328.9 | 110,150.0 | 46,178.9 | 46,175.7 | 3.2 | 55,795.1 | 55,795.1 | - | 5,579.5 | 1,952.8 | - | 63,327.5 | 55,795.1 |
| BULK DENSITY: |  |  |  |  |  |  |  |  |  |  |  |  |  |
| STREAM, #/CF | 64.0 | 64.0 | 64.0 | 64.0 | 100.0 | 92.4 | 92.4 |  | 45.0 | 90.0 |  | 84.5 | 89.2 |
| VOLUME FLOW |  |  |  |  |  |  |  |  |  |  |  |  |  |
| GPM | 304.5 | 214.6 | 90.0 | 89.9 | 0.0 | 75.3 | 75.3 |  | 15.5 | 2.7 |  | 93.5 | 78.0 |
| CY/HR | 90.5 | 63.7 | 26.7 | 26.7 | 0.0 | 22.4 | 22.4 |  | 4.6 | 0.8 |  | 27.8 | 23.2 |
| WT% SOLIDS | 0.010% | 0.010% | 0.010% | 0.003% | 100.000% | 57.000% | 57.000% |  |  |  |  | 65.198% | 57.000% |
| WT% WATER | 99.990% | 99.990% | 99.990% | 99.997% | 0.000% | 43.000% | 43.000% |  |  |  |  | 34.802% | 43.000% |
| WT% WATER / WT% SOLIDS * 100% |  |  |  |  |  |  |  |  |  |  |  |  |  |
| OXIDANT, PPM OF DRY SEDIMENT |  |  |  |  |  |  |  |  |  |  |  |  |  |
| POLYMER, # PER TON OF DRY SEDIMENT |  |  |  |  |  |  |  |  |  |  |  |  |  |
| WATER REMOVED: |  |  |  |  |  |  |  |  |  |  |  |  |  |
| GALLONS PER CY OF RAW SEDIMENT |  |  | 107.9 | 107.9 |  |  |  |  |  |  |  |  |  |
| % OF RAW SEDIMENT VOLUME |  |  | 53.45% | 53.44% |  |  |  |  |  |  |  |  |  |
| FLY ASH ADDED AS % OF DEWATERED SEDIMENT |  |  |  |  |  |  |  |  | 10.00% |  |  |  |  |
| CEMENT ADDED AS % OF DEWATERED SEDIMENT |  |  |  |  |  |  |  |  |  | 3.50% |  |  |  |
| FLY ASH ADDED IN # PER CY OF RAW SEDIMENT |  |  |  |  |  |  |  |  | 111.6 |  |  |  |  |
| CEMENT ADDED IN # PER CY OF RAW SEDIMENT |  |  |  |  |  |  |  |  |  | 39.1 |  |  |  |

Figure 2(b)

METHOD FOR TREATING DREDGED MATERIAL

FIELD OF THE INVENTION

This invention relates to a novel method for treating dredged material in which dredged material is dewatered, contaminants are removed in at least one oxidation process, and the treated dredged material is suitable for beneficial reuse.

BACKGROUND OF THE INVENTION

Periodic dredging of sea and river ports and channels must be performed in order to maintain safe navigable waterways. Unfortunately, due to pollution of our waterways, the dredged material often contains substances which does not allow easy disposal of the dredged material either at sea, or on land. In addition the dredged material typically includes very finely suspended solids which are difficult to separate from the aqueous suspensions and solidify. Moreover, such material includes finely divided clays, shells and organic matter which is typically not directly usable as landfill material.

Conventional approaches for treating dredged materials have included settling techniques and dewatering of the dredged material. Unfortunately, settling procedures require extended term periods and often cannot be practically employed in view of the large amounts of material which must be dredged from a waterway or the vast acreage requirements for settling. In addition dewatering can be an expensive and inefficient process. Further, dredged material contaminated with pollutants, even if dewatered cannot be easily disposed of in landfill or at sea without detriment to the environment.

SUMMARY OF THE INVENTION

Accordingly, there is a need for a method of treating dredged material which can convert dredged material into an environmentally safe substance which is easily disposed of or is suitable for beneficial reuse.

These and other objects of the invention are obtained by a method for treating a dredged material comprising removing bulk particles from the dredged material, first adding liquid to the dredged material, and thereafter separating liquid from the dredged material to obtain a filtrate and solid portion. Contaminants are removed from the dredged material by subjecting the dredged material to at least one oxidation process. The solid portion may be formed into a structural article.

Adding water to the dredged material, prior to dewatering, yields a slurry stream that upon dewatering results in a solid portion which is easily processed into a structural article.

BRIEF DESCRIPTION OF THE DRAWINGS

FIGS. 2(a) and 2(b) are tables setting forth concentration of liquid and solid materials processed in the arrangement of FIG. 1.

DETAILED DESCRIPTION OF THE PREFERRED EMBODIMENTS

Figure 1:
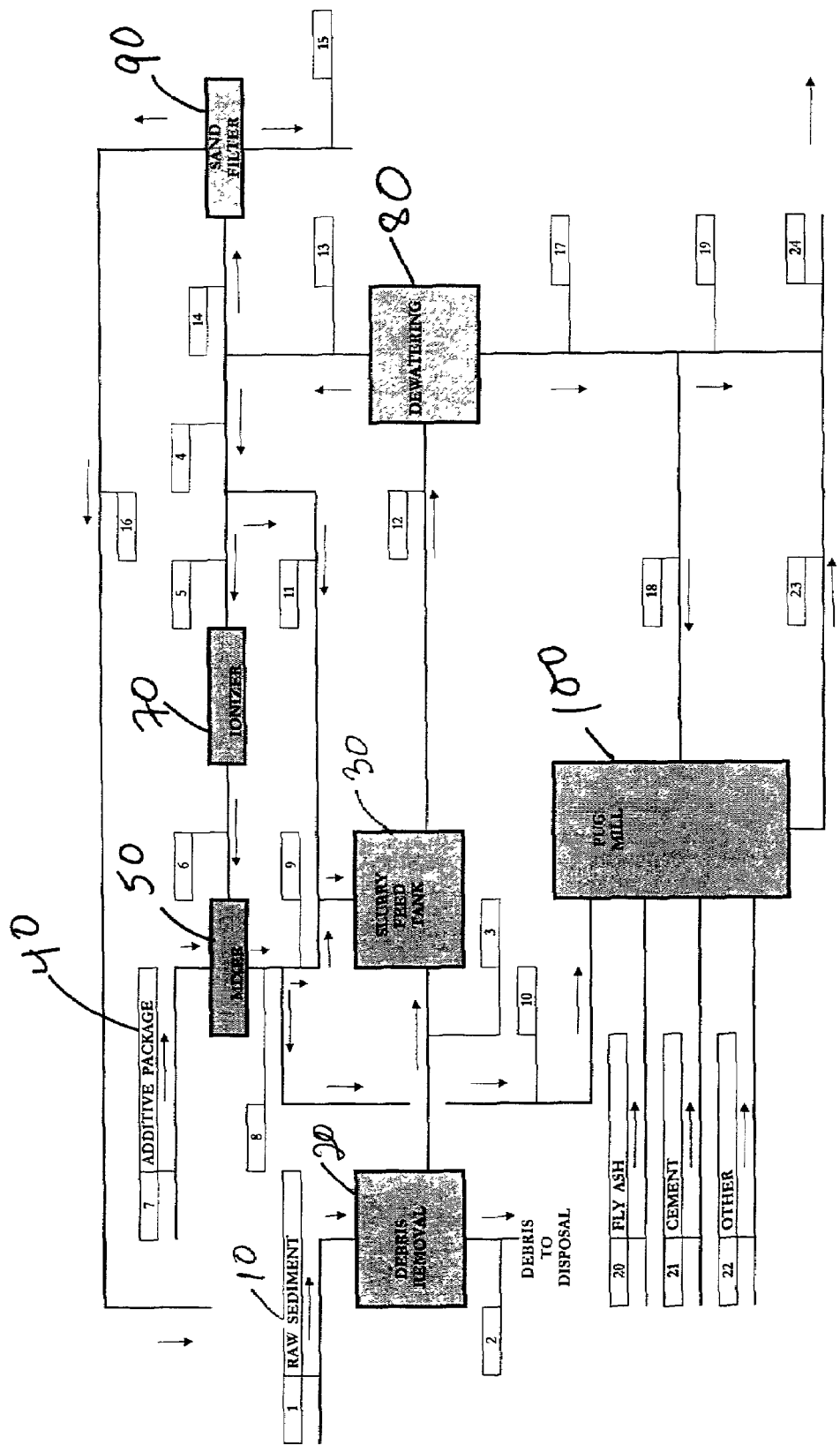
FIG. 1 is a schematic illustration of an arrangement for treating dredged material in accordance with the invention.

An arrangement for treating dredged material is shown in FIG. 1. Raw sediment 10 is obtained from a waterway and loaded onto a vessel or barge. The dredged material may be treated on the barge or vessel itself, or alternatively may be transported to a land based treatment center. Bulk material is removed from the sediment in receptacle 20. The bulk material or debris which has a particle size of greater than ½ inch, preferably greater than ¼ inch, is removed by one or more vibrating screens. The remaining dredged material which typically has a solids content of 25% to 45%, more typically approximately 35% by weight, is conveyed to slurry tank 30 and liquid is added reducing the solids content to 10% to 20%, preferably 15% by weight.

If the dredged material contains organic contaminants, oxidizing agents can be included in an additive package 40 which is mixed in a mixer 50 and added to slurry feed tank 30. Suitable oxidizing agents include but are not limited to the group consisting of oxygen, hydrogen peroxide, ozone, chlorine, chlorine dioxide, sodium hypochlorate, calcium hypochlorate, sodium chlorate, sodium chlorite, bleach, potassium permanganate and mixtures thereof. The amounts of oxidizing agent employed is 100 to 20,000 ppm per ton by weight of dry solids. Suitable oxidizing systems are disclosed in U.S. Pat. No. 5,914,040 which is incorporated by reference herein. Optionally an ionizer 70 can be used to generate oxygen radicals, for example, as disclosed in U.S. Pat. No. 5,587,069 which is also incorporated by reference herein, which also acts as an oxidizing agent.

The additive package 40 preferably includes a flocculating agent which is a polyelectrolyte. Suitable polyelectrolytes are cationic polyelectrolytes including but not limited to neutral polymers and quaternary polyamines, neutral or quaternary polyalklyeneamines and polyhydroxy alkyleneamines, for example polyethyleneamine, poly (2-hydroxy-1-propyl-N-methylammonium chlorine), poly (2-hydroxy-1-propyl-1-N-dimethylammonium chloride), poly (vinyl-2-imidazolinium hydrogensulphate), poly (diallyldimethylammonium chloride, polyaminoacrylates, polyaminomethacrylates, polyaminodialkyl acrylate), for example poly (N,N-dimethylaminoethyl methacrylate) alone or a copolymer with acrylamide, polyaminacrylamides, polymethylacrylamides, polydialkylacrylamides for example, poly (N,N-dimethylaminopropylmethacrylamide) and poly (N,N-dimethylaminoethylacrylamide). A mixture of polyelectrolytes may be used. A preferred cationic polyelectrolyte flocculating agent is a low charge, high molecular weight polyelectrolyte. Most preferred is a copolymer of a quaternary acrylate salt and acrylamide, Nalco N-9908 dry, available from Ondeo-Nalco located in Midlothian, Va. The flocculating agent is added to the dredged material in the amount of 0.5 to 10 lbs per ton of dry dredged material in slurry feed tank 30.

The dredged material is conveyed to a dewatering receptacle 80. The dewatering receptacle may include at least one of a belt press, filter press or centrifuge. The most preferred method of dewatering the dredged material to obtain a filtrate and solid portion is dewatering with a belt press. The filtrate obtained from dewatering receptacle 80 can be recycled to mixer 50 or slurry feed tank 30, or can be further purified by passing the filtrate through sand filter 90.

The solid portion can be fed to a pug mill 100 and combined with structural building materials such as fly ash, cement and other materials to form a structural article as described in U.S. Pat. No. 6,293,731 which is incorporated by reference herein.

In addition, oxidizing agent 22 can be added if contaminants remain present at levels that exceed end use product specifications. The solid portion can be recycled for beneficial re-use. For example, the solid portion can be used as a liner, protective cover, a daily cover or a final cap over a landfill, for strip mine reclamation, paving material for parking lots, airfield construction, road base or the like.

A mass balance spreadsheet for the arrangement shown in FIG. 1 is given in FIGS. 2(a) and 2(b) wherein the raw sediment dredged material, after bulk debris removal, includes 31%±0% by weight liquid and 69%±10% by weight solids. As can be seen from FIGS. 2(a) and 2(b), the slurry feed material conveyed to dewatering receptacle 80 includes 15%±5% by weight solids and 85%±5% by weight liquids. After dewatering, the solid portion including 57%±10% by weight solids and 43%±10% by weight liquid, is conveyed to pug mill 100 where it is mixed with fly ash and cement and other structural materials to form a structural article having 65%±10% by weight solids and 35%±10% by weight liquids.

EXAMPLE

Sediment will be delivered in barges to an unloading platform. Caterpillar 330 long-stick tracked excavators or their equivalent will be utilized for debris removal and sediment transfer. The first excavator will be equipped with "grapples" for the removal of large foreign objects from the sediment. The excavators may be equipped with television monitors to assist the operator when the barge is at a floating level where vision is obstructed. Debris removed during this operation will be placed in roll-off containers that have been strategically placed, possibly on spud barge(s).

Once gross debris has been removed, the second excavator will be used to remove sediment from the barge. This excavator will be equipped with a hydraulic, or electric submersible pump attached to the bucket of the machine. This pump will be equipped with a slurry gate to aid in producing a pumpable slurry for the dewatering operation. Wash nozzles will be placed near the suction point of the pump to aid in producing workable slurry suitable for mechanical dewatering with belt or filter presses, or centrifuges.

Sediment will be pumped from the barge over vibratory screening equipment placed atop a mixing tank. The screening unit will consist of a double-deck vibratory screen, or its equivalent. Material greater than ½ inch, preferably greater than ¼ inch in size (plus ¼), i.e. larger size material, which would adversely affect the mechanical dewatering operation, will be removed during this step. The larger size material will be placed in another roll-off container adjacent to the first mixing tank. The debris and larger size material will be sent to a landfill for disposal. Material smaller than the larger size material will drop through the vibratory screen and into an agitated mixing tank for subsequent transfer to storage-mixing tanks prior to processing in the belt or filter presses or centrifuges.

Progressive cavity sediment feed pumps will pump material from the sediment storage tanks to each of the belt or filter presses or centrifuges. The belt or filter presses or centrifuges will be equipped with one or more batch tanks where a polyelectrolyte flocculating solution will be prepared. This solution will be combined with the sediment when it is pumped from the storage tanks to the belt or filter presses or centrifuges. The flocculating agent will be metered into the sediment depending on sediment flow rates and the percentage and type of solids present in the sediment.

As the sediment is dewatered in the belt or filter presses or centrifuges, filtrate water will be produced. This filtrate together with wash water produced during the dewatering process will be pumped to storage tanks where most of the residual solids will settle out. These storage tanks will be equipped with mixers, which will be used should solids in these tanks need to be placed in suspension and returned to the dewatering operation. The sediment as delivered in the barge is anticipated to contain solids in the 40±10% weight percent range, and therefore, some filtrate will be pumped to the barge to aid in producing a suitable slurry for the dewatering operation while the balance of the filtrate water will be disposed of in accordance with all applicable government rules and regulations. Prior to disposal, this effluent will be passed through a sand filter and other suitable equipment to reduce suspended solids and to meet all applicable water discharge specifications.

Filter cake produced during the mechanical dewatering operation will typically exit the belt or filter presses or centrifuges on conveyors that will deliver cake to a pug mill, as necessary, for blending first with an oxidizing solution for further contaminant reduction as required to meet end product specifications, and additives including cement and fly ash to produce a Beneficial Use Product. Fly ash and cement will be stored in silos. The conveyor that feeds filter cake to the pug mill will be equipped with a weighscale to monitor the weight of material being fed to the pug mill. This weighscale will control the amount of oxidant, cement, fly ash and other additives that are mixed with the filter cake. If required, oxidant can also be added to the dilution tank. Suitable oxidants are described herein above. A proportioning pump will control the addition rate of oxidant, and rotary vane feeders (with speed control) at the bottom of the silos will control the addition rate of the additive materials at various feed rates as determined by the Beneficial Use Product specifications.

The Beneficial Use Product material will exit the pug mill and be conveyed to an area adjacent to the mill where it will be stockpiled and then loaded, by front-end loader, onto rail cars or trucks for shipment to user locations. Alternatively, the Beneficial Use Product may exit the pug mill directly onto rail cars or trucks for shipment to user locations.

One skilled in the art will understand the method of the invention can be carried out in a continuous or a batch mode, either on a barge in a waterway or land based treatment center. While the invention has been described in reference to preferred illustrative embodiments, modifications of the preferred embodiments will be apparent to one skilled in the art upon reference to the specification. These modifications are intended to be within the scope of the invention.

We claim:

1. A method of reducing contaminants in dredged material comprising:
   (a) removing bulk particles from the dredged material,
   (b) adding liquid to the dredged material thereby forming a slurry,
   (c) separating liquid from the dredged material thereby obtaining filtrate and a solid portion, and
   (d) directly mixing the solid portion of step (c) in a pug mill with structural building material additives comprising cement and fly ash, to form a structural article and provide a beneficial use product, wherein contaminants are removed via at least one oxidation process of admixing at least one oxidizing agent with the slurry of dredged material in step (b); and
wherein the solid portion includes a solid component and a liquid component.

2. A method according to claim 1 wherein the at least one oxidation process comprises admixing at least one oxidizing agent with the solid portion.

3. A method according to claim 2 wherein the at least one oxidizing agent is selected from the group consisting of oxygen, hydrogen peroxide, ozone, chlorine, chlorine dioxide, sodium hypochlorate, calcium hypochlorate, sodium chlorate, sodium chlorite, bleach, potassium permanganate and mixtures thereof.

4. A method according to claim 2 where the flocculating agent is a polyelectrolyte.

5. A method according to claim 1 comprising admixing at least one flocculating agent with the slurry of dredged material in step (b).

6. A method according to claim 1 wherein the at least one oxidizing agent is selected from the group consisting of oxygen, hydrogen peroxide, ozone, chlorine, chlorine dioxide, sodium hypochlorate, calcium hypochlorate, sodium chlorate, sodium chlorite, bleach, potassium permanganate and mixtures thereof.

* * * * *